United States Patent
Hagai et al.

(10) Patent No.: US 6,621,932 B2
(45) Date of Patent: *Sep. 16, 2003

(54) VIDEO IMAGE DECODING AND COMPOSING METHOD AND VIDEO IMAGE DECODING AND COMPOSING APPARATUS

(75) Inventors: Makoto Hagai, Osaka (JP); Yoshinori Matsui, Katano (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,351

(22) Filed: Mar. 3, 1999

(65) Prior Publication Data

US 2002/0048406 A1 Apr. 25, 2002

(30) Foreign Application Priority Data

Mar. 6, 1998 (JP) .......................................... 10-054688

(51) Int. Cl.⁷ ................................................. G06K 9/36

(52) U.S. Cl. ...................... 382/233; 382/232; 382/243; 382/284; 382/311; 348/384.1; 348/584; 358/426.01; 345/716; 375/240; 375/240.08; 375/240.25

(58) Field of Search ................................. 382/232, 233, 382/243, 276, 284, 309, 241, 242, 311; 348/384.1, 385.1, 387.1, 388.1, 390.1, 393.1, 584; 358/426, 426.1, 426.03, 426.04; 375/240, 240.01, 240.05, 240.08, 240.16, 240.25; 345/776, 700, 716

(56) References Cited

U.S. PATENT DOCUMENTS

| | | | |
|---|---|---|---|
| 4,645,459 A | 2/1987 | Graf et al. | ..................... 434/43 |
| 5,375,195 A | * 12/1994 | Johnston | ..................... 345/435 |
| 5,708,845 A | 1/1998 | Wistendahl et al. | ......... 345/302 |

(List continued on next page.)

FOREIGN PATENT DOCUMENTS

| | | | |
|---|---|---|---|
| EP | 0 707 427 A2 | 4/1996 | ............ H04N/7/26 |
| EP | 0 719 049 A2 | 6/1996 | ............ H04N/7/24 |

OTHER PUBLICATIONS

Bober, et al (Video Coding for Mobile communications-MPEG–4 Perspective), IEEE, pp. 1–9, Dec. 6, 1996.*

(List continued on next page.)

*Primary Examiner*—Daniel G. Mariam
(74) *Attorney, Agent, or Firm*—Burr & Brown

(57) ABSTRACT

A video image decoding and composing apparatus includes: a composing information memory for storing composition information; an arbitrary shape object decoding means for decoding a coded signal of an arbitrary shape object video image; a shape memory for storing a shape signal which is decoded by the arbitrary shape object decoding means; a texture memory for storing a texture signal which is decoded by the arbitrary shape object decoding means; a rectangular shape object decoding means for decoding a coded signal of a rectangular shape object video image; a video image memory for storing a video image signal which is decoded by the rectangular shape object decoding means; a composing means for composing the shape signal stored in the shape memory, the texture signal stored in the texture memory, and the video image signal stored in the video image memory, in accordance with the composition information stored in the composition information memory; a position indicating means for indicating a position in the composed image which is output from the composing means; and a shape selecting means for selecting only the shape signal according to the instruction from the position indicating means.

7 Claims, 8 Drawing Sheets

U.S. PATENT DOCUMENTS

| | | | | |
|---|---|---|---|---|
| 5,822,460 A | * | 10/1998 | Kim | 382/243 |
| 5,933,535 A | * | 8/1999 | Lee et al. | 382/243 |
| 5,991,453 A | * | 11/1999 | Kweon et al. | 382/250 |
| 6,057,884 A | * | 5/2000 | Chen et al. | 375/240.16 |
| 6,128,344 A | * | 10/2000 | Aono et al. | 375/240.11 |
| 6,177,928 B1 | * | 1/2001 | Basso et al. | 345/302 |

OTHER PUBLICATIONS

Sikora "The MPEG–4 Video Standard Verification Model", IEEE, pp. 19–31, Feb. 1997.*

Eleftheriadis. "the MPEG–4 System and Description Languages: from Practice to Theory", IEEE, pp. 1480–1483, Jun. 1997.*

Koenen "Coding of Moving Pictures and Audio", ISO/IEC JTC1/SC29/WG11, pp. 1–45, Oct. 1997.*

Avaro, O. et al., "*The MPEG–4 systems and description languages: A way ahead in audio visual information representation*," Signal Processing Image Communications, vol. 9, No. 4, May 1, 1997, pp. 385–431.

Brailean, Jim et al., "*Chapter 30: MPEG–4 Video Coding Standard*," Proceedings of 1997 International Symposium on Circuits and Systems, Circuits and Systems in the Information Age ISCAS 1997, Jun. 9, 1997.

Eleftheriadis, A, "*The MPEG–4 System and Description Languages: From Practice to Theory*," IEEE International Symposium on Circuits and Systems, Jun. 9, 1997, pp. 1480–1483.

Kang, Y. et al., "*A Novel Architecture for Real–time Sprite Decoding*," Proceedings of the 40th Midwest Symposium on Circuits and Systems MWSCAS '97, Sacramento, CA, Aug. 3–6, 1997, vol. 2, Aug. 3, 1997, pp. 1142–1145.

* cited by examiner

VIDEO IMAGE DECODING AND COMPOSING METHOD AND VIDEO IMAGE DECODING AND COMPOSING APPARATUS

FIELD OF THE INVENTION

The present invention relates to a video image decoding and composing method which can realize interactive operation by a user and a video image decoding and composing apparatus, and also a video image composition information coding method.

BACKGROUND OF THE INVENTION

Up to now, video image compression methods such as MPEG1, or MPEG2 have been utilized in the coding of natural video images. Further, there is an object coding method which divides a moving video image into objects in the video image and encodes the video images for each object and each background, as a new coding method.

FIG. 7 is a conceptual view showing composition of object video images. In the figure, numeral 701 represents a background video image, and numerals 702 to 705 designate video images of objects in the video images. Numerals 706 and 707 designate composed images. As the objects, there are rectangular shape object images such as background image 701 and arbitrary shape objects having arbitrary shapes other than a rectangular shape such as objects 702 to 705. The arbitrary shape object is constituted by a texture video image showing a color signal and a shape video image showing the shape. The objects of the video images 704, 705 are supposed to be located in the foreground relative to the objects of the video images 702, 703.

First of all, the background video image 701 and the texture video image 702 of the object which is the closest to the background are composed using the shape video image 703, thereby to output the composed video image 706. Next, the texture video image 704 is composed with the composed video image 706 using the shape video image 705, thereby to output the composed video image 707. By these operations, the composed video image is produced. Herein, as shape video images, there is a two-value video image which only indicates whether it is inside or outside of the object, and a video image which indicates the ratio of composition of the pixel values of the background to that of the object by multi-values, thereby enabling semi-transparent composition. In the object coding method, the rectangular shape object video image (701), the arbitrary shape object video image (702, 703), and the arbitrary shape object video image (704, 705) can be individually coded for each object. In the MPEG-4 video image coding method, it is possible to perform encoding of such object image having arbitrary shapes other than the rectangular shape.

On the other hand, even in the computer graphics data, the standardization of coding methods has been advancing. As a standard coding method, there is a virtual reality modeling language. In this coding method, information of a top, a line, and a surface, and their materials (such as color, light reflection parameter) can be coded, and it is possible in the decoding apparatus to re-structure the scene of computer graphics by decoding the coded signal of the virtual reality modeling language.

Recently, a coding method comprising combination of the object coding method and the computer graphics data coding method has also attracted attention. When the computer graphics data coding method is extended to the composition of the object video image, changing of the composition positions and the composition with the computer graphics images, of the object images of the object coding method can be performed.

In MPEG-4, there is also realized a coding method comprising a combination of the above-described object coding method and the computer graphics data coding method. By extending the computer graphics data coding method to the composition of the object video image, it is possible to compose the object video image of the object coding method with the computer graphics video image. Thereby, it is possible to realize the computer graphics of higher presentation ability relative to the prior art.

FIG. 8 shows an example of a video image decoding and composing apparatus comprising a combination of the object coding method and the computer graphics data coding method. Hereinafter, a coded signal describing the composition information of the object video image as the above-described extended computer graphics data coded format is called a composition information coded signal.

Numeral 801 designates a composition information coded signal, numeral 802 designates a composition information coded signal decoding means for analyzing the composition information coded signal 801 and outputting the result as composition information, numeral 803 designates a composition information memory storing the composition information as the output of the composition information coded signal decoding means 802, numeral 804 designates a coded signal of the arbitrary shape object video image, numeral 805 designates an arbitrary shape object decoding means for decoding the coded signal 804, and numeral 806 designates a shape memory storing a shape video image signal which is decoded by the arbitrary shape object decoding means 805. Numeral 807 designates a texture memory for storing a texture video image signal which is decoded by the arbitrary shape object decoding means 805. Numeral 808 designates a coded signal of the rectangular shape object video image and numeral 809 designates a rectangular shape object decoding means for decoding the coded signal 808. Numeral 810 designates a video image memory for storing the video image signal which is decoded by the rectangular shape object decoding means 809. Numeral 811 designates a composing means for composing the shape signal stored in the shape memory 806, the texture signal stored in the texture memory 807, and the video image signal stored in the video image memory 810 in accordance with the composition information stored in the composition information memory 803. Numeral 812 designates a composition video image signal which is output from the composing means 811.

The operation of the video image decoding and composing apparatus constructed as described above will be described with reference to the drawings and the tables which follow.

An example of the composition information coded signal 801 is shown in Table 4. This is described in a format similar to that of the virtual reality modeling language. For the detail of the format of the virtual reality modeling language, please see "VRML2.0-3D cyber space structuring language-" by Kenjiro Miura, Asakura Shoten, 1996. In the format, a node and a field accompanying the node are included. In this example, Group, Shape, Appearance, MovieTexture, and Rectangle objects are nodes. The "children" is a field of Group node, the "appearance" and "geometry" are fields of Shape node, the "texture" is a field of Appearance node, and url is a field of MovieTexture node. The Group node represents a group of nodes, and describes the collection of nodes at the "children" field. The "MovieTexture" node represents a moving video image which is to be texture mapped to the object (in this example, Rectangle node) which is represented by the "geometry" field of the Shape node, and the location of the coded video image signal corresponding to the moving video image is described in the url field.

The composition information coded signal may be compressed in the text format as shown in Table 4, or may be further compressed in the binary format as in MPEG-4.

The arbitrary shape object decoding means 805 inputs and decodes the arbitrary shape coded signal 804, and the decoded shape video image is stored in the shape memory 806 and the texture video image in the texture memory 807, respectively. The rectangular shape object decoding means 809 inputs and decodes the rectangular object coded signal 808, and the decoded video image is stored in the video image memory 810. The composing means 811 composes the texture video image of the arbitrary shape object stored in the texture memory 807 and the rectangular shape video image stored in the video image memory 810 in accordance with the composition information stored in the composition information memory. When the arbitrary shape video image is composed, the shape video image in the shape memory 806 is used. The composition means 811 outputs the composed video image signal as the composed video image signal 812. It is possible for the composer of the coded data to perform the composition of the decoded video image object freely by using the composition information coded signal.

On the other hand, there is an attempt that a user of the display apparatus should perform an interactive operation for the display object by the computer graphics. In the above-described virtual reality modeling language, an interactive operation for the computer graphics object is realized.

However, up to now, while the interactive operation for the object of computer graphics has been devised, the interactive operation by the user for the arbitrary shape object video image in the object coding has not been conceived. For example in the case shown in Table 4, when the user intends to select the arbitrary shape object video image by an operation with such as a mouse, the shape information of the object video image is not considered. Therefore, the object video image may be erroneously selected although its position is out of the shape.

SUMMARY OF THE INVENTION

It is an object of the present invention to easily realize an interactive operation by the user in a decoding and composing apparatus of an arbitrary shape object.

According to a first aspect of the present invention, a video image decoding and composing method for decoding a video image coded signal having shape information in shape units and composing the decoded signals together to decode an object video image, uses a shape video image obtained by decoding the video image coded signal in detecting an object video image relating to the object existing at a predetermined position on a video screen.

According to a second aspect of the present invention, a video image decoding and composing method for decoding a video image coded signal having shape information in shape units and composing the decoded signals together to decode an object video image, composes only respective shapes video image obtained by decoding the object video image as a video image signal, together.

According to a third aspect of the present invention, in the video image decoding and composing method as defined in the second aspect of the invention, said shape video images are composed after being geometrically transformed.

According to a fourth aspect of the present invention, in the video image decoding and composing method as defined in the second aspect of the invention, said shape video images are composed after being assigned colors in the shapes.

According to a fifth aspect of the present invention, in the video image decoding and composing method as defined in the second aspect of the invention, said shape video images are composed after textures being mapped to the shape video images.

According to a sixth aspect of the present invention, a video image decoding and composing method for decoding a video image coded signal having shape information thereby to decode object video images in shape units, comprises a composition information coded signal indicating shape video images which are obtained when the video images are decoded being input, and a plurality of the video images being composed in accordance with said composition information coded signal.

According to a seventh aspect of the present invention, a video image decoding and composing apparatus comprises a composition information coded signal decoding means for decoding a composition information coded signal; a composition information memory for storing composition information as the output of said composition information coded signal decoding means; an arbitrary shape object decoding means for decoding a coded signal of an object video image having an arbitrary shape other than a rectangular shape; a shape memory for storing a shape signal which is decoded by the arbitrary shape object decoding means; a texture memory for storing a texture signal which is decoded by the arbitrary shape object decoding means; a rectangular shape object decoding means for decoding a coded signal of a rectangular shape object video image; a video image memory for storing a video image signal which is decoded by the rectangular shape object decoding means; a composing means for composing the shape signal stored in the shape memory, the texture signal stored in the texture memory, and the video image signal stored in the video image memory in accordance with the composition information stored in the composition information memory; a position indicating means for indicating a position in a composed image which is output from the composing means; and a shape selecting means for selecting only the shape signal according to the instruction from the composing means.

DETAILED DESCRIPTION OF THE INVENTION

An embodiment of the present invention will be described with reference to the drawings.

Embodiment 1

First of all, the interactive operation which should be realized in this first embodiment will be described.

Figure 2:
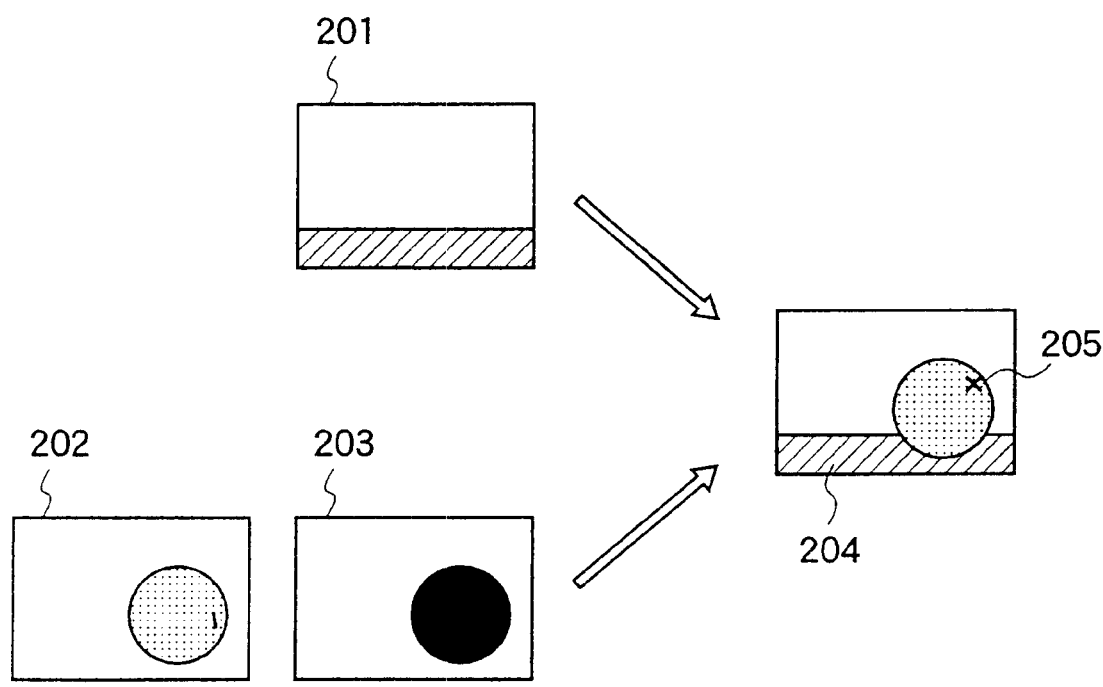
FIG. 2 is a conceptual view illustrating detection of the object video image in the first embodiment of the present invention.

FIG. 2 is a conceptual view illustrating the selection of the object. Reference numeral 201 designates a background video image (rectangular shape object video image), numeral 202 designates a texture video image of an arbitrary shape object video image, numeral 203 designates a shape video image corresponding to the texture video image 202, and numeral 204 designates a composed video image comprising the video images 201 to 203. It is supposed that the arbitrary shape object video images 202, 203 are positioned in the foreground. It is also supposed that a user pointed to the position 205. The decoding and composing apparatus searches the object which is positioned at 205 and it detects that the arbitrary shape objects 202 and 203 exist thereat. If the detected object is assumed to be an object which the user has selected, it is possible to perform the object selection by the user. By assigning the selection of the user to the arbitrary shape objects 202 and 203, it is possible to perform an interactive operation with the user. For example, the button operation by the arbitrary shape object such that selection of a particular object by the user leads to calling out of a separate operation, or a drag operation of an arbitrary shape object by such as a mouse of a personal computer can be realized.

A video image decoding and composing apparatus according to the first embodiment of the present invention will be described with reference to FIGS. 1 to 5 and Tables 1 to 3.

Figure 1:
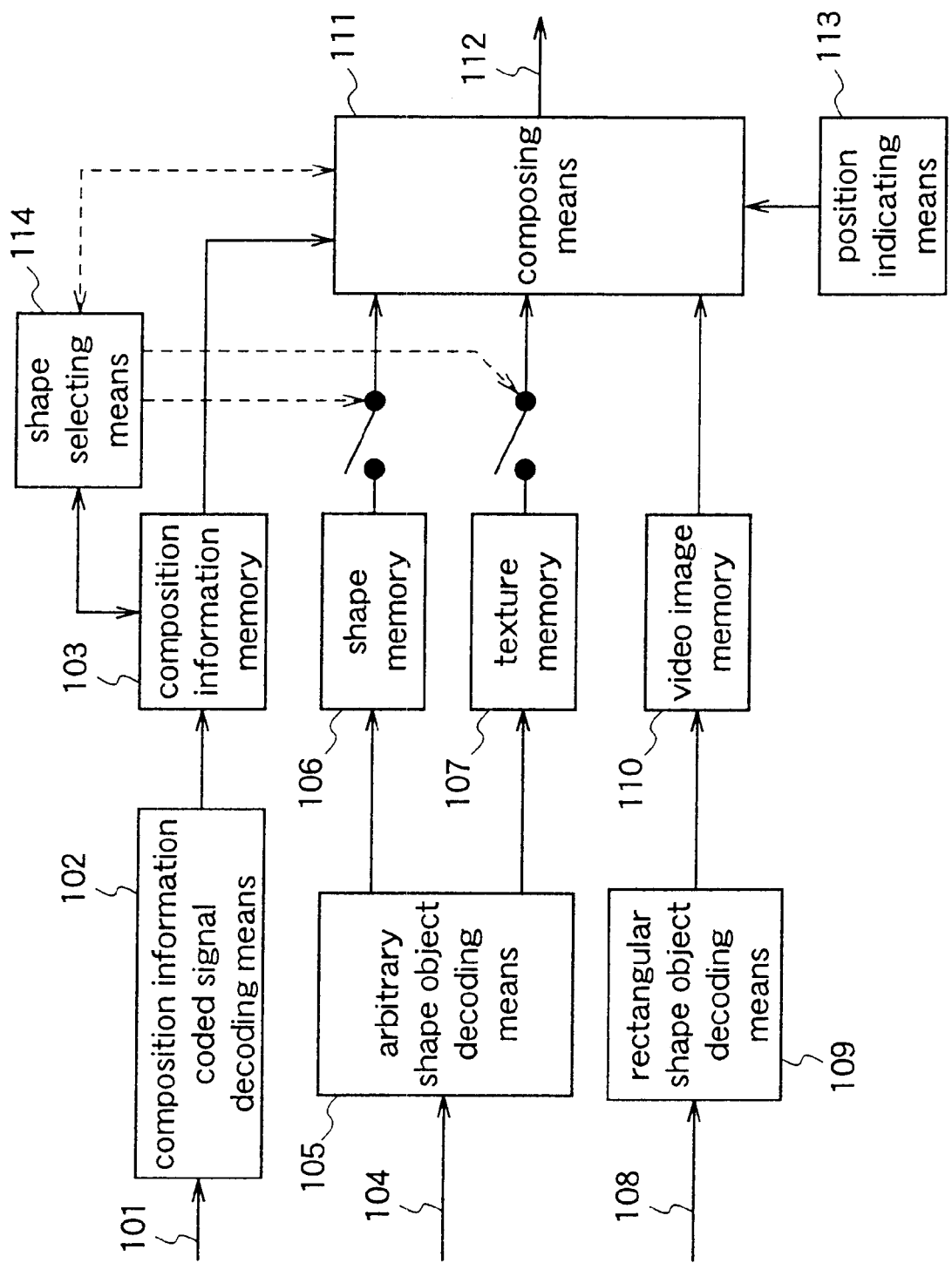
FIG. 1 is a block diagram illustrating a video image decoding and composing apparatus according to a first embodiment of the present invention.

FIG. 1 is a block diagram illustrating an example of a basic structure of a video image decoding and composing apparatus according to the first embodiment of the present invention. In the figure, numeral 101 designates a composition information coded signal. Numeral 102 designates a composition information coded signal decoding means for decoding the composition information coded signal 101, numeral 103 designates a composition information memory storing composition information as the output of the composition information coded signal decoding means 102, numeral 104 designates a coded signal of an arbitrary shape object video image, numeral 105 designates an arbitrary shape object decoding means for decoding the coded signal 104, numeral 106 designates a shape memory storing a shape video image signal which is decoded by the arbitrary shape object decoding means 105. Numeral 107 designates a texture memory for storing a texture video image signal which is decoded by the arbitrary shape object decoding means 105. Numeral 108 designates a coded signal of a rectangular shape object video image and numeral 109 designates a rectangular shape object decoding means for decoding the coded signal 108. Numeral 110 designates a video image memory for storing a video image signal which is decoded by the rectangular shape object decoding means 109. Numeral 111 designates a composing means for composing the shape signal stored in the shape memory 106, the texture signal stored in the texture memory 107, and the video image signal stored in the video image memory 110 in accordance with the composition information stored in the composition information memory 103. Numeral 112 designates a composition video image signal which is output from the composing means 111. Numeral 113 designates a position indicating means for indicating a position in the output composed video images. Numeral 114 designates a shape selecting means for selecting only the shape signal in accordance with the indication by the composing means 111.

The operation of the video image decoding and composing apparatus constructed as described above will be described with reference to the drawings and the tables.

The composition information coded signal decoding means 102 inputs and decodes the composition information coded signal 101 and stores a decoded result in the composition information memory 103. The details of the composition information coded signal 101, the composition information coded signal decoding means 102, and the composition information memory 103 will be described later. The arbitrary shape object decoding means 105 inputs and decodes the arbitrary shape object video image coded signal 104 and stores a decoded shape video image in the shape memory 106 and a decoded texture video image in the texture memory 107, respectively. The rectangular shape object decoding means 109 inputs and decodes the rectangular shape object video image coded signal 108 and stores a decoded video image in the video image memory 110. The composing means 111 composes the shape video image stored in the shape memory 106, the texture video image stored in the texture memory 107, and the video image stored in the video image memory 110 in accordance with the composed video image information stored in the composition information memory 103, and outputs the result as the composed video image signal 112.

Here, the composition information coded signal will be described.

Table 1 shows an example of the composition information coded signal. This is described in the format similar to that of the virtual reality modeling language. Hereinafter, this Table 1 will be described with reference to FIGS. 3 and 4.

Figure 3:
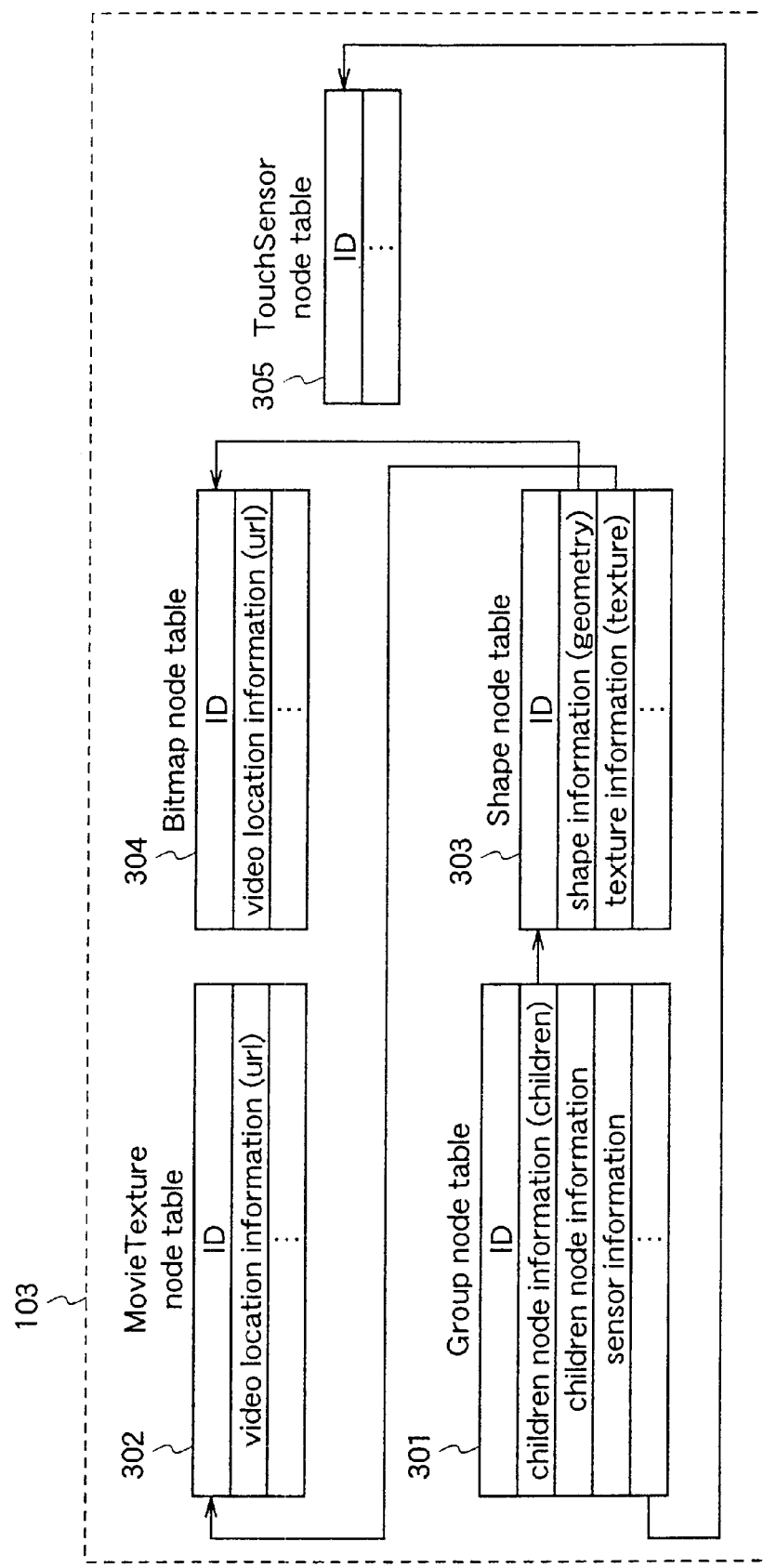
FIG. 3 is a conceptual view illustrating the composition information memory in the first embodiment of the present invention.
Figure 4:
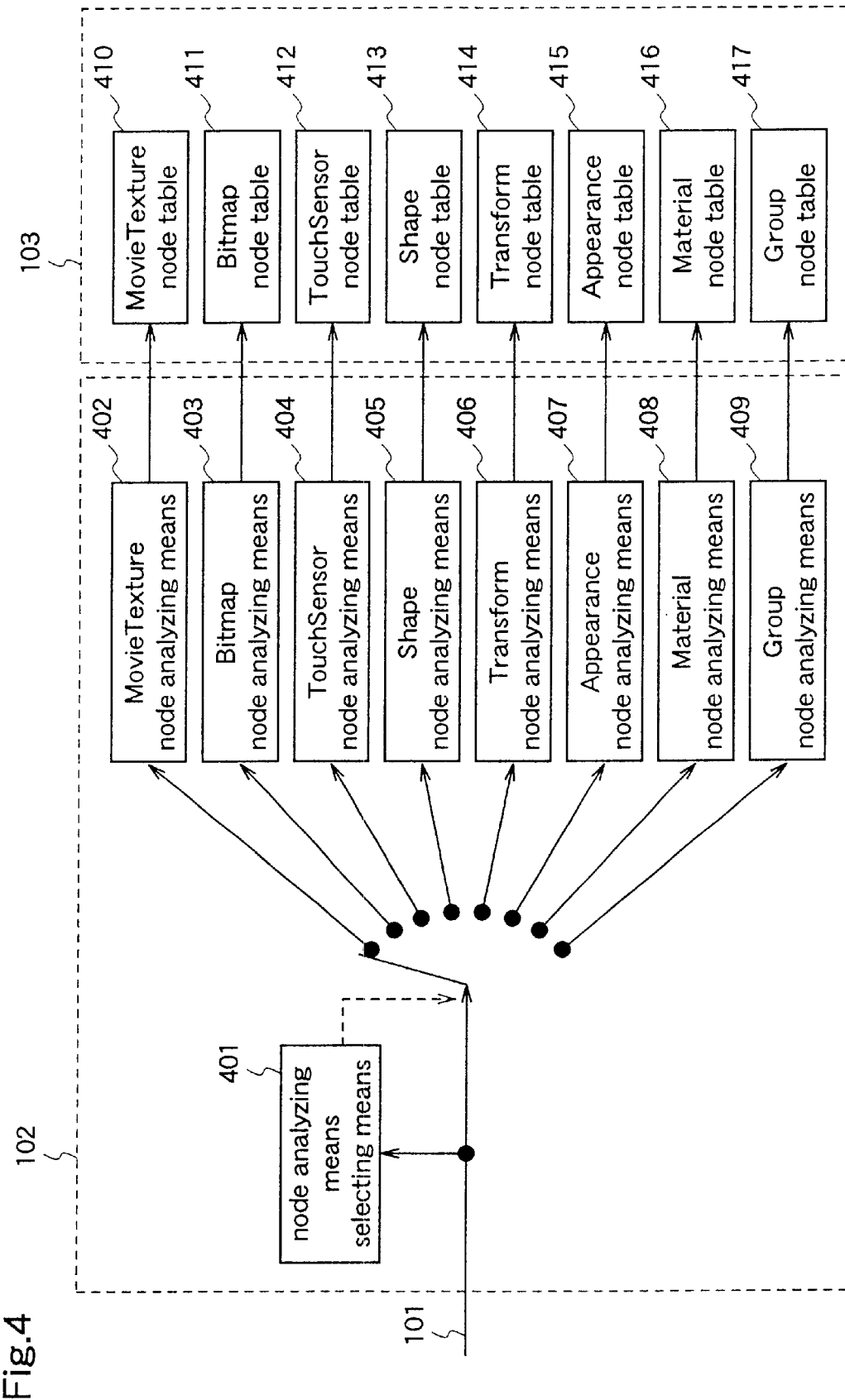
FIG. 4 is a block diagram illustrating the composition information coded signal decoding means in the first embodiment of the present invention.

FIG. 3 is a conceptual view showing the composition information obtained from the composition information coded signal in Table 1 and FIG. 4 is a detailed block diagram illustrating the composition information coded signal decoding means 102. Reference numeral 401 designates a node analyzing means selecting means for selecting an appropriate node analyzing means upon receipt of the composition information coded signal 101. Numerals 402 to 409 designate node analyzing means corresponding to the respective nodes of MovieTexture node, Bitmap node, TouchSensor node, Shape node, Transform node, Appearance node, Material node, and Group node. Numerals 410 to 417 designate node tables for storing the composition information as the analysis results of the respective node analysis means 402 to 409. The Group, Shape, TouchSensor nodes are the same as those in the Virtual Reality Modeling Language (for detail of the grammar of the virtual reality modeling language, please see "VRML2.0-3D cyber space structuring language-" By Kenjiro Miura, Asakura Shoten, 1996). With reference to the above drawings, the composition information of Table 1 will be described. Here, the names of the nodes are assigned for convenience, and if the nodes have the same functions, different names may be assigned.

The TouchSensor node in Table 1 is a node for performing a different processing when the user selects a shape which is related to the TouchSensor node by clicking with an element such as a mouse, and the interactive operation with the user can be described in this node. When the shape which is related to the TouchSensor node is selected, the TouchSensor node is made effective (The processing when the TouchSensor node is effective, is of course described in the Touch-Sensor node, but it is omitted in the description here for simplification). In this first embodiment, the interactive operation using the TouchSensor node will be described.

By the Group node on the first line in Table 1, the node analyzing means selecting means 401 selects the Group node analyzing means 409. The Group node analyzing means 409 detects the children field. The children field includes the Shape node. This information can be stored by the Group node analyzing means 409 as in the Group node table 301. Similar selecting of the node analyzing means and analyzing processing are performed for each node in the children field of the Group node. After all the nodes are analyzed, the composition information as shown in FIG. 3 is obtained. The arrows indicate the references to the different node tables and these references are held as a memory pointer or an identifier to the reference destination node tables.

The composition information coded signal according to the present invention is different from the prior art in that there exists the Bitmap node for indicating the shape of the object video image signal. In this example, the Bitmap node refers to the shape signal included in the video image coded signal described in the url field of the MovieTexture node. This shape is related to the TouchSensor node, and when the position in the shape is selected, the TouchSensor node is made effective.

The interactive operation for the arbitrary shape object video image when the TouchSensor node is utilized will be described. The user indicates a position in the video image by the position indicating means 113 such as a mouse. The object selection will be judged from the objects positioned in the foreground successively as follows. A shape in the shape memory of the object video image to be judged is selected by the shape selection means 114, a pixel value of the position in the video image indicated is searched, and if the pixel value shows that the pixel is in the object shape, then the object video image is supposed to be selected. When there exists a TouchSensor node which is related to the selected object video image, the TouchSensor node is made effective. If the object video image positioned in the foreground is not selected, the judgment processing is carried out repeatedly sequentially from the object video image in the foreground up to the background video image.

As described above, in this first embodiment, by defining the node indicating the shape of the object video image and using the node, the interactive operation by the user in the video image decoding and composing apparatus which decodes and composes the arbitrary shape object can be realized.

In this first embodiment, the Bitmap node which can refer to the shape from the video image object is defined, but the definition of the TouchSensor node can be extended as shown in the following.

Table 2 is an example of a composition information coded signal including the extended TouchSensor node. The extended TouchSensor node is related to the shapes included in all the children nodes of the parent node for the TouchSensor node similarly to the usual TouchSensor node. In the prior art method, the TouchSensor node on line 3 of Table 2 is related to the shape of the Rectangle on line 10 and when the object shown by the Rectangle node is selected, the TouchSensor node is made effective. However, when the shape is included in the object video image which is referred to the url field of the MovieTexture node, the TouchSensor node should not be made effective when it is outside the shape. In this way, it is possible to judge whether the object video image exists at the selected position by the similar method to that when the Bitmap node is utilized.

In addition, in the first embodiment, the TouchSensor node is utilized for the interactive operation, but the other sensor nodes such as CylinderSensor node, SphereSensor node, and PlaneSensor node in the virtual reality modeling language can be used therefor. The functions of these sensor nodes may be extended for the coded signals of the arbitrary shape object similarly to the TouchSensor in the first embodiment and the nodes whose functions are extended may be defined as new nodes.

While in this embodiment the definition of the Touch-Sensor is extended, a node which has the equivalent function to that of the extended TouchSensor can be defined as a different (separate) new node.

Embodiment 2

While in the first embodiment the function of the Touch-Sensor node for the shape video image is described, the shape video image itself can be utilized for the display. More particularly, it is possible to perform the geometrical transformation, addition of color, and attaching of texture to the shape video image to realize the composition display. Hereinafter, the production of shadow of the object image using the shape video image will be described in this second embodiment.

Figure 5:
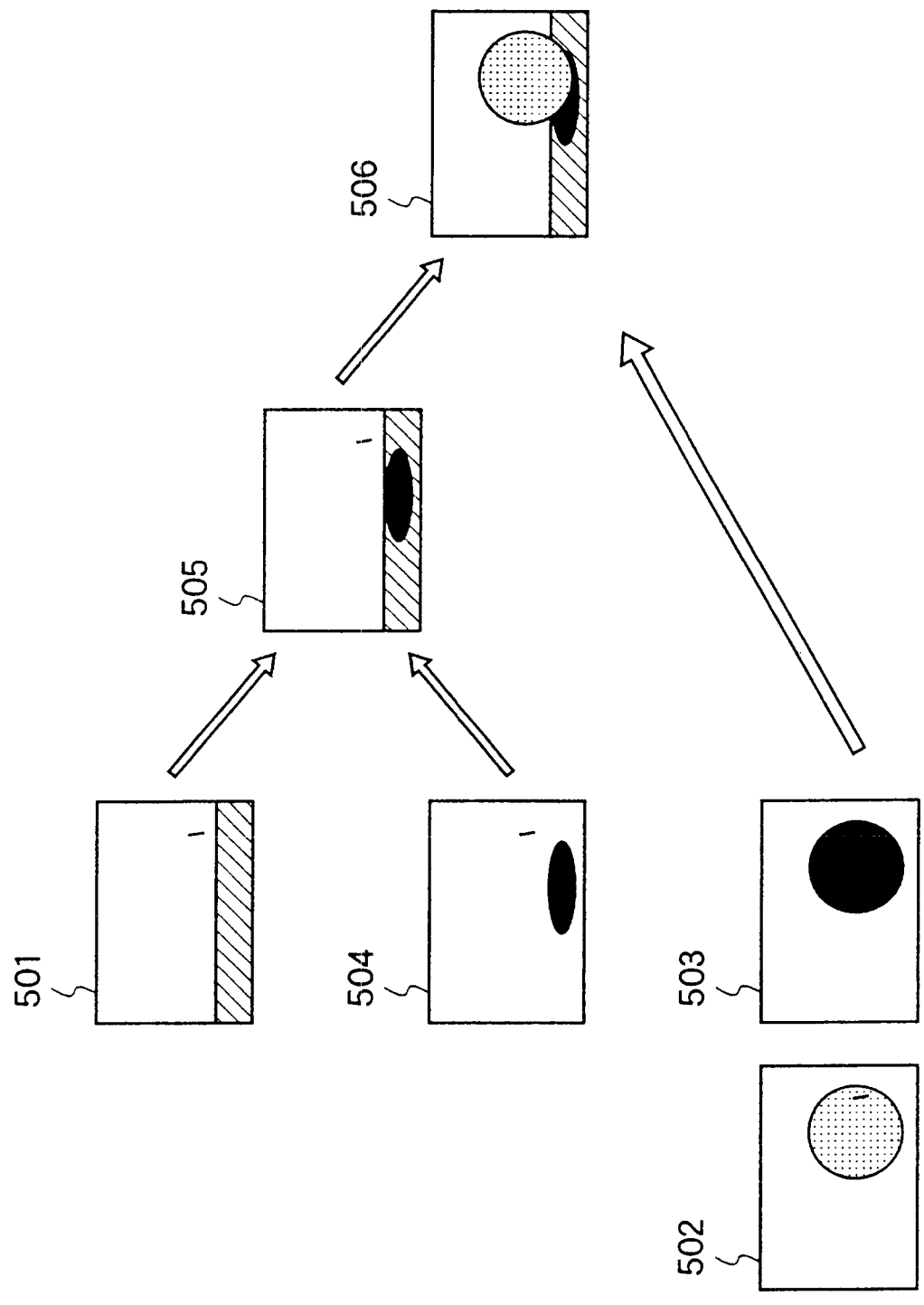
FIG. 5 is a conceptual view illustrating the generation of the shadow of the object video image in the first embodiment of the present invention.

FIG. 5 is a conceptual view showing the production of shadow of the object vide image. Numeral 501 designates a background video image and numeral 502 designates a texture video image of the object. Numeral 503 designates a shape video image of the object. Numeral 504 designates a shape video image which is produced by transforming the shape video image 503. Numerals 505 and 506 designate composed video images, respectively. The shape video image 503 is transformed into the shape video image 504 showing the shadow thereof, by an appropriate geometrical transformation. The shape video image 504 is composed with the background video image 501 to produce the composition video image 505. The composition is performed supposing the pixel value in the shape of the video image 504 (pixel value of the shadow) has a constant value in place of using the texture video image 502. The composition video image 505 and the arbitrary shape object video images 502, 503 are composed to output the composed video image 506.

Table 3 shows an example of composition information coded signal when producing a shadow. The Group, Transform, Shape, Appearance, Material nodes are the same as those in the virtual reality modeling language. In the url field of the Bitmap node, there is described the location of a coded signal of the object video image ("video1"). The material characteristics, i.e., color of the shape is given by the Material node on lines 9 to 11. The shape to which the color is attached is geometrically transformed by the Transform node, and the shadow of the arbitrary shape object video image is generated, and the video image which is obtained by composing the shadow and the arbitrary shape object video image is output. When a texture is to be attached to the shape, the texture may be assigned to the texture field of the Appearance node.

Here, the video image signal in this embodiment may be a still video image or a moving video image.

In addition, as the arbitrary shape object video image coded signal in the second embodiment, the video image coded signal indicating the transparent pixel value as the transparent type GIF file and the transparent type animation GIF file may be employed. In this case, the object shape can be obtained depending on whether the pixel value of the video image is transparent or not, similarly in the processing in this embodiment.

Further, in this embodiment, the arbitrary shape object video image signal which is obtained by coding the texture video image and the shape video image is input and decoded, but the coded signal of only the shape video image may be input and decoded.

Further, in this embodiment, when only the shape video image of the arbitrary shape object coded signal is referred, only the shape video image may be decoded.

Further, while in this embodiment the format using the url field of the Bitmap node is employed to indicate the location of the coded signal including the shape signal of this embodiment, it is, for example, possible to employ a format in which the MovieTexture node is used and the location of the coded signal is described in the url field therein, as in the first embodiment. Also in this case, if the texture is replaced by the material characteristics (color) described in the Material node, the same effects as those in this embodiment can be obtained.

In addition, while in the first and second embodiments there are provided one arbitrary shape object decoding means and one rectangular shape object decoding means, a plurality of the respective means may be provided. Or there may be provided only one selected from the arbitrary shape object decoding means and the rectangular shape object decoding means.

In addition, the composition information coded signal of the first and second embodiments may be coded in the letter format as shown in Table 1 or in the binary format.

In addition, in the first and second embodiments the format in the virtual reality modeling language is referred as the format of the composition information coded signal, but if the function indicating the shape of the object video image such as the function corresponding to the Bitmap node or the extended TouchSensor node in this embodiment can be represented, the other formats can be employed.

In addition, while in the first and second embodiments the composition information coded signal, the arbitrary shape object coded signal, and the rectangular shape coded signal are separately input, the multiplexed data may be input and de-multiplexed to the respective data to be processed.

Embodiment 3

This third embodiment shows a video image coding and composition information coding apparatus which generates the composition information coded signal, the arbitrary shape object video image coded signal, and the rectangular shape object video image coded signal, which are input in the first embodiment.

Figure 6:
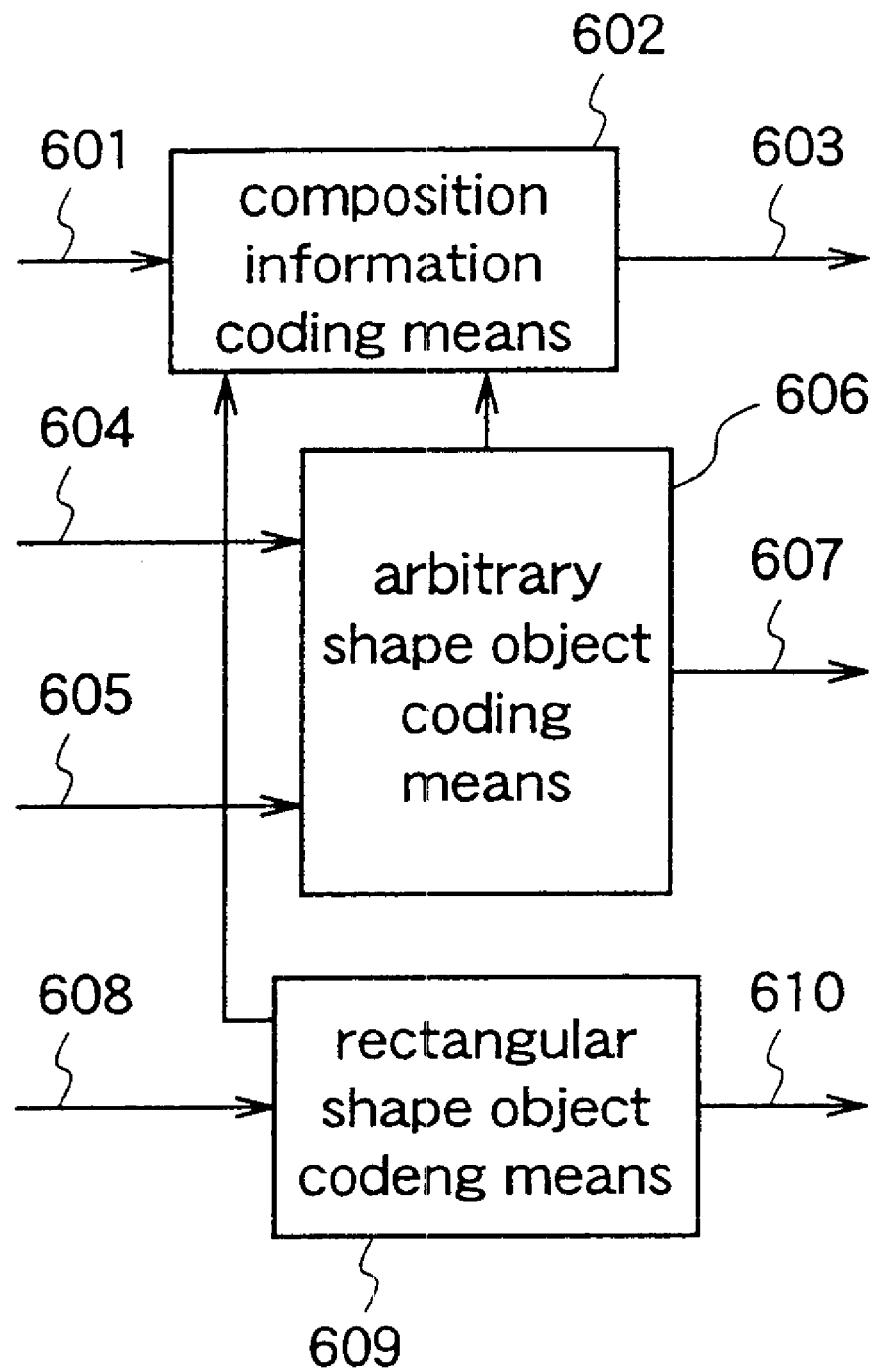
FIG. 6 is a block diagram illustrating the composition information coding apparatus according to a third embodiment of the present invention.
Figure 7:
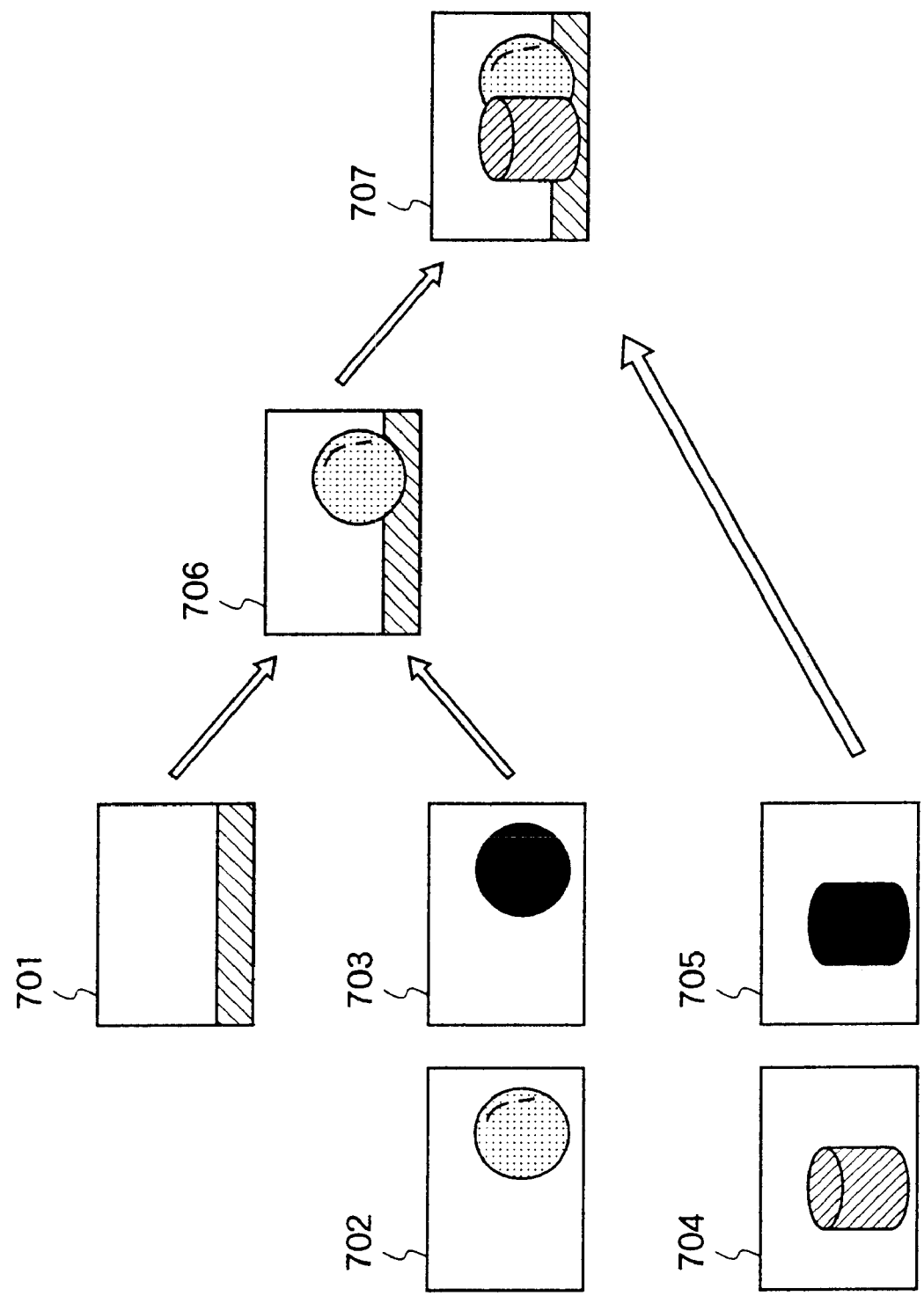
FIG. 7 is a conceptual view illustrating composition of an object video image.
Figure 8:
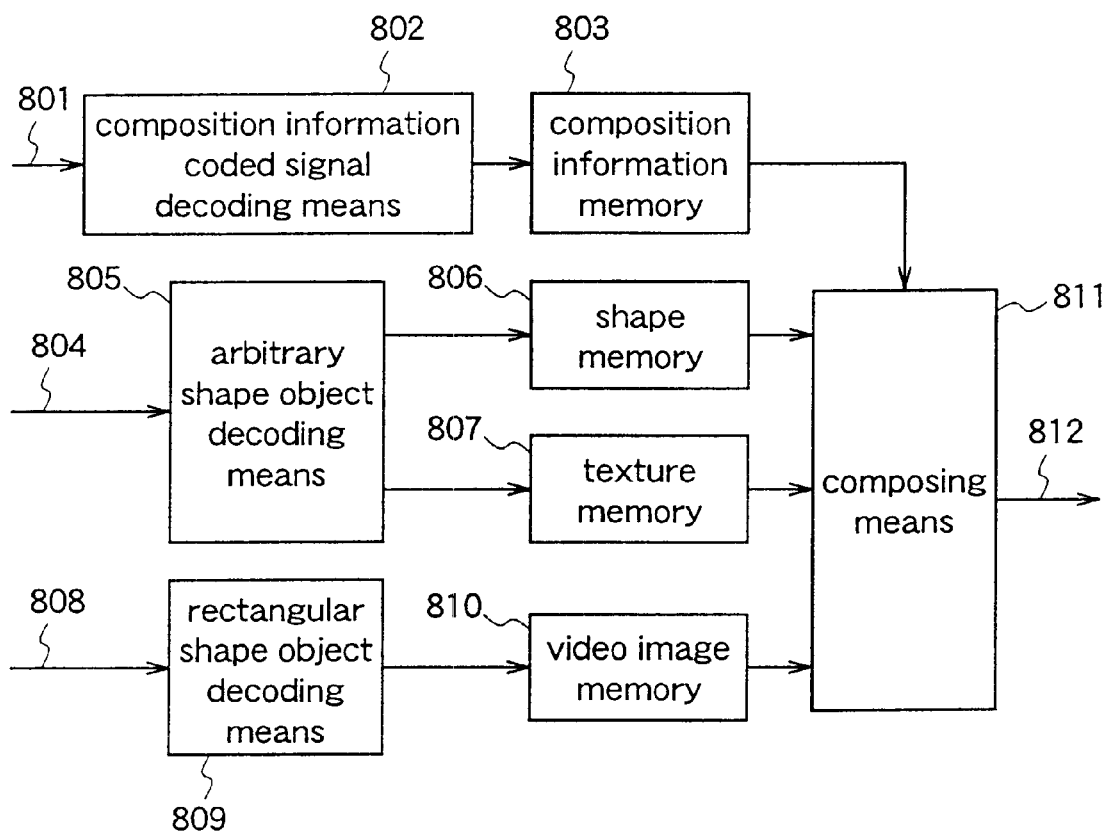
FIG. 8 is a block diagram illustrating the prior art video image decoding and composing apparatus.

FIG. 6 is a block diagram illustrating an example of the fundamental construction of the video image coding and composition information coding apparatus according to the third embodiment of the present invention. In the figure, reference numeral 601 designates composition information, numeral 602 designates composition information coding means for coding the composition information 601, numeral 603 designates a composition information coded signal which is output from the composition information coding means 602. Numeral 604 designates a shape video image signal. Numeral 605 designates a texture video image signal. Numeral 606 designates an arbitrary shape object coding means for coding the shape video image signal 604 and the texture video image signal 605. Numeral 607 designates an arbitrary shape object video image coded signal output from the arbitrary shape object coding means 606. Numeral 608 designates a rectangular shape video image signal. Numeral 609 designates a rectangular shape object coding means for coding the rectangular shape object video image signal 608. Numeral 610 designates a rectangular shape object video image coded signal which is output from the rectangular shape object coding means 609.

The operation of the video image coding and composition information coding apparatus constructed as described above will be described with reference to the drawings.

The composition information coding means 602 inputs and encodes the composition information 601 and outputs the composition information coded signal 603. As the format of the composition information coded signal 603, the format employed in the first embodiment can be employed. The node indicating the shape of the object video image can be coded by the composition information coding means 602. The arbitrary shape object coding means 606 inputs and encodes the texture video image signal 604 and the shape video image signal 605 corresponding thereto, and outputs the arbitrary shape object video image coded signal 607. The rectangular shape object coding means 609 inputs and encodes the rectangular shape object video image signal 608 to output the rectangular shape object video image coded signal 610.

As described above, in this embodiment, the composition information including the node indicating the shape of the video image object can be coded.

Here, while in the third embodiment there are provided one arbitrary shape object coding means and one rectangular shape object coding means, a plurality of the respective means may be provided. Or there may be provided only one selected from the arbitrary shape object coding means and the rectangular shape object coding means.

In addition, as the arbitrary shape object video image coded signal in the third embodiment, the video image coded signal indication of the transparent pixel value as the transparent type GIF tile and the transparent type animation GIF file may be employed.

In the third embodiment, only the shape video image may be coded by the arbitrary shape object coding means to output the coded signal.

Further, while in this embodiment the composition information coded signal, the arbitrary shape object video image coded signal, and the rectangular shape coded signal are separately output, these may be output in multiplex.

Here, the composition information coded signal, the arbitrary shape object video image coded signal, and the rectangular shape coded signal in the third embodiment can also be transmitted and recorded.

As described above, according to the present invention, a video image decoding and composing method in which the interactive operation by the user can be easily performed is realized.

TABLE 1

Substitute Specification
Appendix A

```
Group {                                      1
    children [                               2
        TouchSensor{......}                  3
        Shape {                              4
            appearance Appearance {          5
                texture MovieTexture         6
                    url "video1"             7
                }                            8
            }                                9
            geometry Bitmap { }             10
        }                                   11
    ]                                       12
}                                           13
```

TABLE 2

Substitute Specification
Appendix A

```
Group {                                      1
    children [                               2
        TouchSensor{......}                  3
        Shape {                              4
            appearance Appearance {          5
                texture MovieTexture         6
                    url "video1"             7
                }                            8
            }                                9
            geometry Rectangle { }          10
        }                                   11
    ]                                       12
}                                           13
```

TABLE 3

Substitute Specification
Appendix A

```
Group {                                      1
    children [                               2
        Transform {                          3
            scale {......}                   4
            translation {...}                5
            children [                       6
                Shape {                      7
                    appearance Appearance {  8
                        material Material {  9
                            diffusecolor 0,0,0  10
                        }                   11
                    }                       12
                    geometry Bitmap {       13
                        url "video1"        14
                    }                       15
                }                           16
            ]                               17
        }                                   18
    ]                                       19
}                                           20
```

TABLE 4

Substitute Specification
Appendix A

```
Group {                                      1
    children [                               2
        Shape {                              4
            appearance Appearance {          5
                texture MovieTexture         6
```

TABLE 4-continued

Substitute Specification
Appendix A

```
                    url "video1"             7
                }                            8
            }                                9
            geometry Rectangle { }          10
        }                                   11
    ]                                       12
}                                           13
```

What is claimed is:

1. A video image decoding and composing method which includes a decoding step of decoding a video image coded signal including shape information which indicates the shape of an object video image included in a screen, in shape units, and a composition step of subjecting a video image signal obtained by the decoding to a composition process in which the object video image is composed with other video image, wherein:

said decoding step obtains the shape information indicating the shape of the object video image, by the decoding of the video image coded signal; and said composition step includes a decision step of deciding whether a pixel in a designated position in the screen is an inside pixel of the object video image, on the basis of the shape information.

2. A video image decoding and composing method which includes a decoding step of decoding a video image coded signal including shape information which indicates the shape of an object video image included in a screen, in shape units, and a composition step of subjecting a video image signal obtained by the decoding to a composition process in which the object video image is composed with other video image, wherein:

said decoding step obtains the shape information indicating the shape of the object video image, by the decoding of the video image coded signal; and said composition step performs the composition process to the shape information so that only a shape video image indicating the shape of the object video image is composed with other video image.

3. The video image decoding and composing method as defined in claim 2, wherein said composition step includes a transformation step of subjecting the shape information obtained in the decoding step to a transformation process so that the shape of the object video image indicated by the shape information is transformed into specific shapes, and subjects the shape information to the composition process in which the shape video image representing the transformed specific shapes of the object video image is composed with other video image.

4. The video image decoding and composing method as defined in claim 2, wherein said composition step subjects the shape information obtained in the decoding step to a color assignment process for assigning a color of an inside region of the shape video image representing the shape of the object video image as prescribed colors, and subjects the shape information to the composition process in which the shape video image having the prescribed color and indicating the shape of the object video image is composed with other video image.

5. The video image decoding and composing method as defined in claim 2, wherein said decoding step obtains the shape information indicating the shape of the object video image and texture information indicating the texture of the object video image from the video image coded signal, by the decoding of the video image coded signal; and said composition step subjects the shape information to a texture mapping process for mapping the texture of the object video image to the shape video image representing the shape of the object video image on the basis of the texture information which is obtained in the decoding step, and subjects the shape information to the composition in which the shape video image having the texture and representing the shape of the object video image is composed with other video image.

6. A video image decoding and composing method which includes a decoding step of decoding a video image coded signal including shape information which indicates the shape of plural object video images included in a screen, in shape units, and a composition step of subjecting a video image signal obtained in the decoding step to a composition process in which the object video images are composed with each other, each of the video image signals corresponding to each object video image, comprising:

said decoding step decodes a composition information coded signal which includes information for obtaining the shape information indicating the shapes of the object video images as a decoding process for a composition information coded signal including composition information which is used for the composition of the object video images and said composition step composes the plural object video images on the basis of the composition information which is obtained by the decoding of the composition information coded signal.

7. A video image decoding and composing apparatus comprising:

a composition information coded signal decoding means for decoding a composition information coded signal;

a composition information memory for storing composition information as the output from said composition information coded signal decoding means;

an arbitrary shape object decoding means for decoding a video image coded signal corresponding to an arbitrary shape object video image having an arbitrary shape other than a rectangular shape;

a shape memory for storing a shape signal indicating the shape of the arbitrary shape object video image, the shape signal being obtained by the decoding of the video image coded signal;

a texture memory for storing a texture signal indicating a texture of the arbitrary shape object video image, the texture signal being obtained by the decoding of the video image coded signal;

a rectangular shape object decoding means for decoding a video image coded signal corresponding to a rectangular shape object video image having a rectangular shape;

a video image memory for storing a video image signal which is obtained by decoding the video image coded signal in the rectangular shape object decoding means;

a composing means for composing at least one shape signal stored in the shape memory and the texture signal stored in the texture memory with the video image signal stored in the video image memory, in accordance with the composition information stored in the composition information memory;

a position indicating means for outputting a position indication signal which indicates a position in a composed video image indicated by a composition signal which is obtained by the composition in the composing means; and a shape selecting means for selecting only a shape signal corresponding to a specific object video image, in accordance with an indication signal, wherein said composition means outputs the indication signal to the shape selecting means on the basis of the position indication signal from the position indicating means, the indication signal indicating an object video image including the indicated position in the composed video image as a specific object video image.

* * * * *

UNITED STATES PATENT AND TRADEMARK OFFICE
CERTIFICATE OF CORRECTION

PATENT NO.   : 6,621,932 B2
DATED        : September 16, 2003
INVENTOR(S)  : Makoto Hagai and Yoshinori Matsui It is certified that error appears in the above-identified patent and that said Letters Patent is hereby corrected as shown below:

<u>Column 13,</u>
Lines 15-16, please change "the shape" to -- shapes --

Signed and Sealed this

Second Day of December, 2003

JAMES E. ROGAN
*Director of the United States Patent and Trademark Office*